US010369910B1

(12) United States Patent
Atragene et al.

(10) Patent No.: US 10,369,910 B1
(45) Date of Patent: Aug. 6, 2019

(54) AESTHETIC SEAT BACKREST PANEL FOR A MOTOR VEHICLE

(71) Applicant: LEAR CORPORATION, Southfield, MI (US)

(72) Inventors: Maurizio Atragene, Rivalta di Torino (IT); Giorgio Ursino, Collegno (IT); Marco Rossi, Nichelino (IT)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/869,182

(22) Filed: Jan. 12, 2018

(51) Int. Cl.
*B60N 2/60* (2006.01)
*B60N 2/68* (2006.01)

(52) U.S. Cl.
CPC .......... *B60N 2/6018* (2013.01); *B60N 2/686* (2013.01)

(58) Field of Classification Search
CPC .... B60N 2/686; B60N 2/6018; B60N 2/6027; B60N 2/90; B60N 2/5825
USPC ............................ 297/228.13, 440.2, 452.18
See application file for complete search history.

(56) References Cited

U.S. PATENT DOCUMENTS

| | | | | |
|---|---|---|---|---|
| 4,047,756 A * | 9/1977 | Ney | ........................ | B60N 2/58 297/219.1 |
| 4,541,885 A * | 9/1985 | Caudill, Jr. | ......... | B29C 66/1122 156/220 |
| 4,890,885 A * | 1/1990 | Grossmann | .......... | A47C 27/086 297/284.1 |
| 5,064,247 A * | 11/1991 | Clark | ....................... | A47C 3/04 297/232 |
| 5,193,229 A * | 3/1993 | Smith | .................... | A47K 13/14 4/245.5 |
| 5,510,167 A * | 4/1996 | Candolfi | ................ | A47C 31/11 150/158 |
| D463,704 S * | 10/2002 | Hoffman, Jr. | .................. | D6/611 |
| 6,761,412 B1 * | 7/2004 | Garnweidner | .......... | B60N 2/68 297/452.18 |
| 6,981,748 B2 * | 1/2006 | Garnweidner | ....... | B60N 2/5825 297/218.1 |
| 7,314,251 B1 * | 1/2008 | Lin | ......................... | A47C 7/42 297/440.2 |
| 7,340,813 B2 * | 3/2008 | Hampton | ................. | A47C 7/24 29/91 |
| 7,673,939 B2 * | 3/2010 | Taguchi | ............... | B60N 2/5816 297/218.1 |
| 9,345,330 B2 * | 5/2016 | Andrade | ................. | A47C 5/12 |

(Continued)

FOREIGN PATENT DOCUMENTS

EP 2487065 8/2012
EP 2546099 1/2013

(Continued)

OTHER PUBLICATIONS

Website www.en.wikipedia.org/wiki/Zipper Wikipedia, "Zipper" Dated Dec. 13, 2017, Retrieved Jan. 9, 2018.

*Primary Examiner* — Milton Nelson, Jr.
(74) *Attorney, Agent, or Firm* — Brooks Kushman P.C.

(57) ABSTRACT

A backrest for a seat in a motorized vehicle including a frame with interconnected generally horizontally and vertically extending members. A hard panel is connected to at least some of the horizontally and vertically extending members so that the panel is supported therebetween. The backrest includes a decorative backrest cover. The backrest includes a fastener that openably unites peripheral edges of the cover at least partially around the panel.

14 Claims, 3 Drawing Sheets

(56) References Cited

U.S. PATENT DOCUMENTS

| | | | | |
|---|---|---|---|---|
| 10,173,563 B2 * | 1/2019 | Kurobe | ............... | B60N 2/6027 |
| 2010/0320826 A1 * | 12/2010 | Wilson | .................... | B60N 2/68 |
| | | | | 297/452.18 |
| 2016/0297339 A1 | 10/2016 | Tosco et al. | | |

FOREIGN PATENT DOCUMENTS

| | | | | |
|---|---|---|---|---|
| EP | 3078542 A1 * | 10/2016 | ............ | B60N 2/682 |
| EP | 3078542 | 6/2017 | | |
| WO | 2014063838 | 5/2014 | | |
| WO | WO-2016084757 A1 * | 6/2016 | ............... | B60N 2/60 |

* cited by examiner

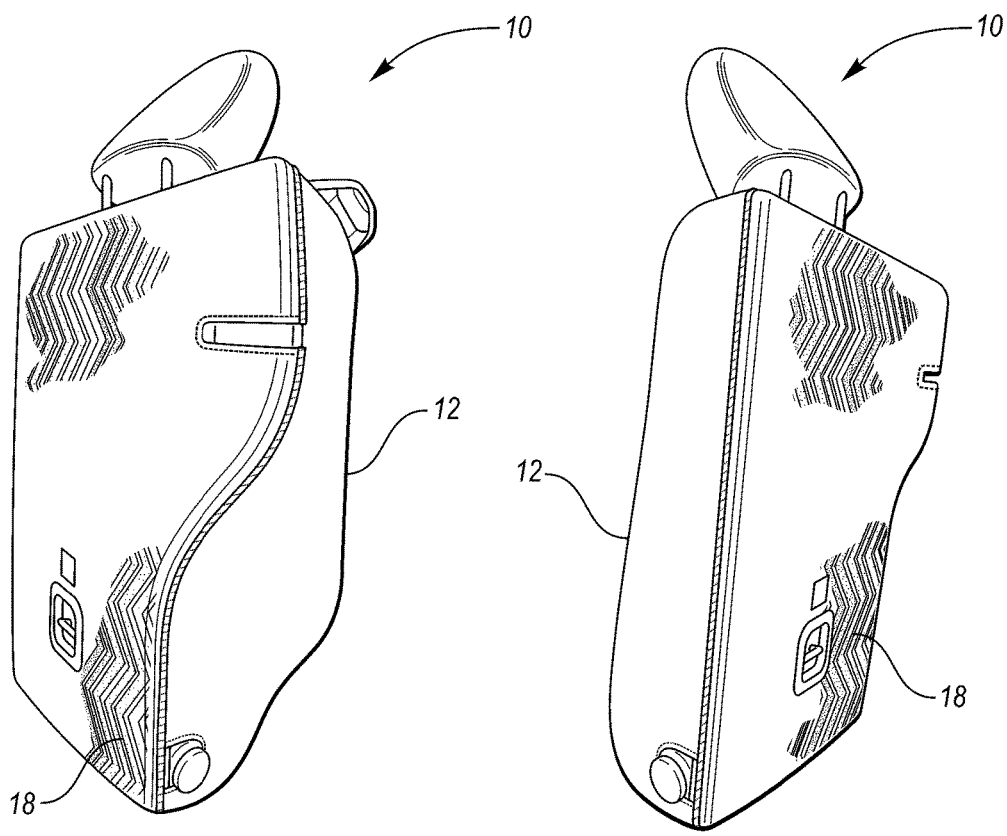
FIG. 1   FIG. 2
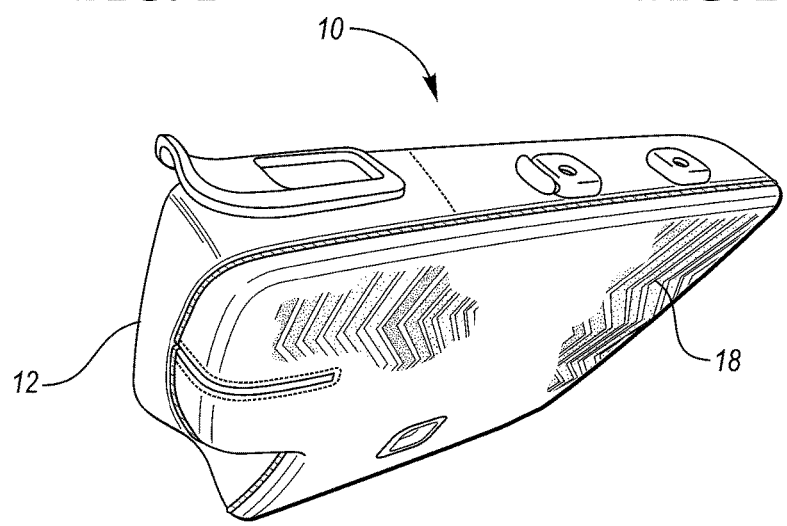
FIG. 3

AESTHETIC SEAT BACKREST PANEL FOR A MOTOR VEHICLE

BACKGROUND OF THE INVENTION

(1) Field of the Invention

Several aspects of this disclosure relate to a seat backrest in a motor vehicle, and more particularly to an aesthetic backrest with a zipper closure mechanism.

(2) Description of Related Art

Conventionally, the rear seats of motor vehicles form a forward face of a baggage storage space. Accordingly, such faces must be able to resist forces associated with sudden deceleration unsecured luggage may move forwardly in such circumstances.

To resist such forces, rear seats often have a hard panel supported by a frame around which one or more layers of a padded material may be disposed. Frequently, a seat cover envelops the hard panel or padded material.

The frame is often made of a tubular metallic material. A recess may be provided in or around an edge of the frame within which fittings are engaged to secure the hard panel or seat cover.

Generally, a finishing panel made of a plastic or vinyl material may be disposed across a rear-facing side of the plate, so as to enhance the appearance of the seatback and thus the baggage area.

One way to assemble the seat is to insert the padding material between the panel and the material that covers the rear of a seat. This compresses the padding material. When the padding expands, it tends to fill a void between the panel and the seat cover, thus erasing crease lines that may otherwise form.

Among the art considered before filing this application are these references: EP 3078542B1; EP 2546099; WO 2014/063838; EP 2487065.

SUMMARY OF INVENTION

Against this background, it would be desirable to have a cooperative arrangement between material that covers the rear of a seat and the hard panel plus seat frame such that the material can readily be replaced. One way to do this is to provide a closable seam that runs at least partially around at least some edges of the material. In one embodiment, a zipper fastening mechanism is suitable for this purpose.

One advantage of removability and ready replacement is that the seat cover can be freshened or removed and cleaned by a user when desired.

As to appearance of the seat cover and thus the front of the baggage area, it may be advantageous to provide the material that covers the seat back with a customizable, decorative surface that is aesthetically pleasing.

BRIEF DESCRIPTION OF THE DRAWINGS

This disclosure includes the following detailed description and these drawings:

FIG. 1 is a perspective view of a preferred embodiment of the rear of a seat backrest according to the present disclosure;

FIG. 2 is a perspective view of another side of the rear seat backrest shown in FIG. 1;

FIG. 3 is a perspective view from above the rear of a bench seat backrest;

DETAILED DESCRIPTION OF THE INVENTION

Figure 4:
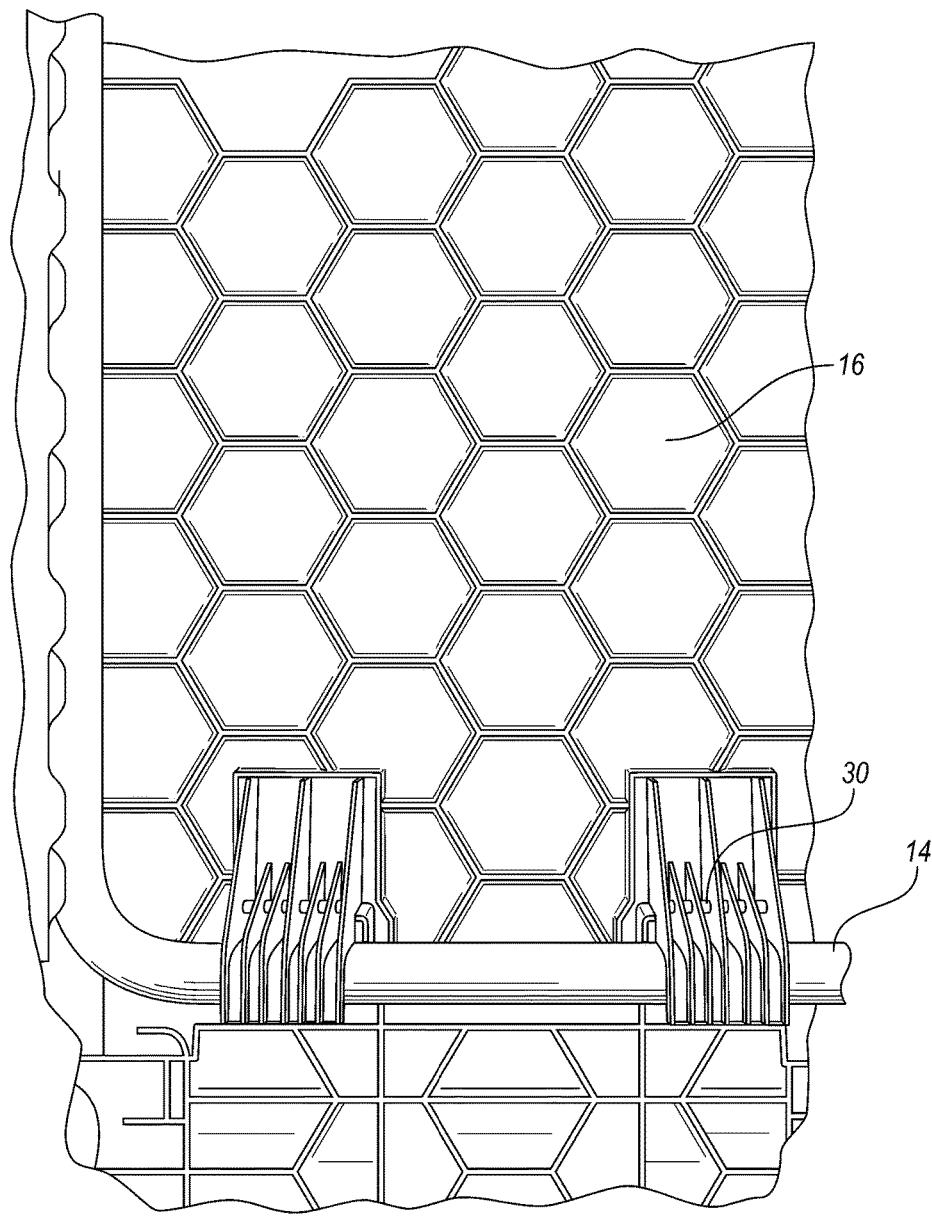
FIG. 4 is a B-surface of a hard panel supported between frame members within the seat.

FIGS. 1-2 depict different sides of a seat backrest 10 of the type found in a motor vehicle. Although the seat suggested is a rear seat 12, the disclosure is not so limited, because much of the description that follows may apply to seats in a front or middle row.

The backrest 10 has a frame 14 (FIG. 4), a hard panel 16 and an outer cover 18 (FIG. 1). Optionally inserted between the panel 16 and the cover 18 is a padding (not shown) that may be made of a foam or wadding material.

Lying atop the hard panel 16, the cover 18 is often made of a malleable material such as a fabric which may be susceptible to creasing in the absence of surface tension.

Inside the seat 12, the hard panel 16 is usually made of a composite or of a plastic material that is preferably thermoformed. If a composite material is used, fiber-reinforced plastics may be included. As shown in FIG. 4, the panel 16 in some embodiments has a cell-like structure. Optionally the panel may have multiple layers.

Figure 5:
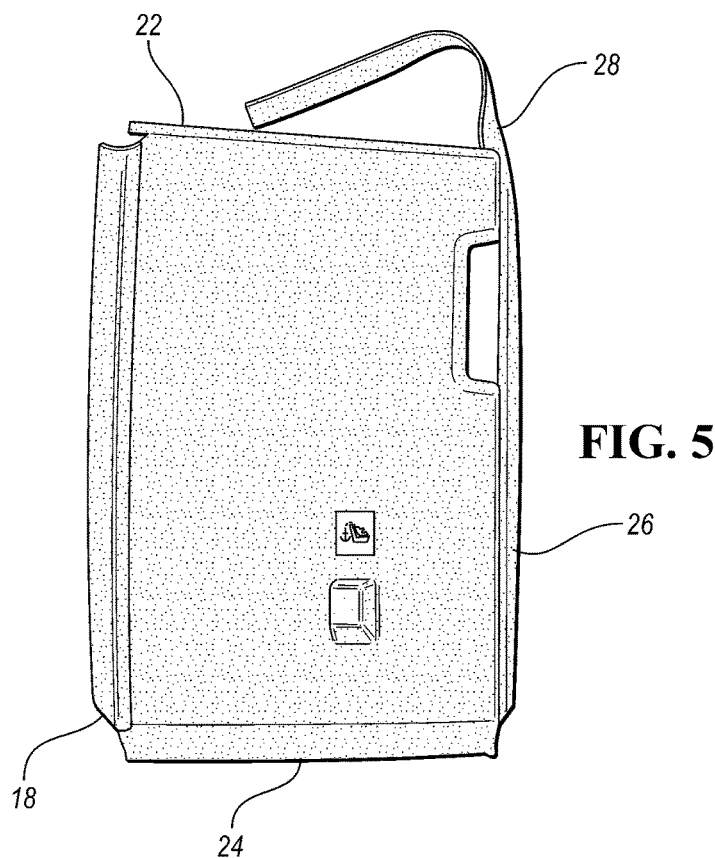
FIG. 5 is a carpet-covered hard panel from at least some edges of which a zipper extends.
Figure 6:
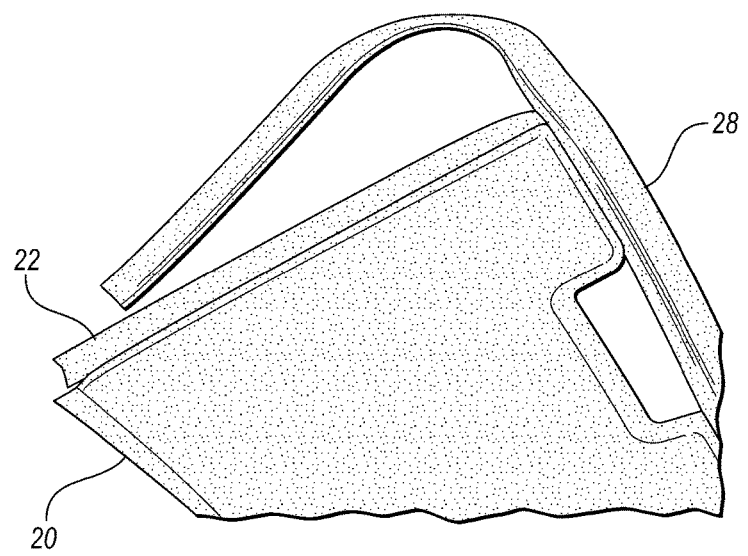
FIG. 6 is a view of another side thereof.

Referring to FIGS. 5-6, the panel 16 may be at least partially encapsulated in a carpet-type of covering 18 with peripheral edges 20, 22, 24, 26. A zipper 28 may run along at least some of the peripheral edges.

Behind a row of seats 12, the cover 18 at the back of the seat 10 defines a terminal part of a baggage space at the rear of the motor vehicle. The cover 18 is optionally provided with a decorative layer that can be held in place and if desired removed for cleaning or for a change in appearance with the aid of the zipper 28.

Turning now to FIG. 4, the panel 16 is secured to the frame 14 by for example clips 30 or comparable molded components that extend along generally horizontal or vertical members associated with the frame 14.

It will be appreciated that the zipper 28 has two rows of protruding teeth, which may be made to interdigitate, thus linking the rows. en.wikipedia.org/wiki/Zipper. A slider, operated by hand, moves along the rows of teeth. Id. Inside the slider is a Y-shaped channel that meshes together or separates the opposing rows of teeth, depending on the direction of the slider's movement. Id.

As defined in en.wikipedia.org/wiki/Zipper, incorporated by reference, the components of a zipper may include a:

1. Top tape extension (the fabric part of the zipper, that extends beyond the teeth, at the top of the chain);
2. Top stop (two devices affixed to the top end of a zipper, to prevent the slider from coming off the chain);
3. Slider (the device that moves up and down the chain to open or close the zipper);
4. Pull tab or puller (the part of the slider that is held to move the slider up or down);
5. Tape width (refers to the width of the fabric on both sides of the zipper chain);
6. Chain or zipper teeth (the continuous piece that is formed when both halves of a zipper are meshed together) and chain width (refers to the specific gauge of the chain);

7. Bottom stop (a device affixed to the bottom end of a zipper, to prevent further movement of the half of the zipper from separating);

8. Bottom tape extension (the fabric part of the zipper, that extends beyond the teeth, at the bottom of the chain);

9. Single tape width (refers to the width of the fabric on one side of the zipper chain);

10. Insertion pin (a device used on a separating zipper whose function is to allow the joining of the two zipper halves);

11. Retainer box or pin box (a device used on a separating zipper whose function is to correctly align the pin, to begin the joining of the zipper halves); and 12. Reinforcement film (a strip of plastic fused to each half of the zipper tape to allow a manufacturer to electronically "weld" the zipper onto the garment or item that is being manufactured, without the need for sewing or stitching). See, *"Zipper Parts". ZipperSource, Retrieved* 27 Sep. 2013.

We claim:

1. A backrest for a seat in a motorized vehicle, the backrest including:
    a frame with interconnected generally horizontally and vertically extending members;
    a hard panel connected to at least some of the horizontally and vertically extending members so that the panel is supported therebetween;
    a backrest cover formed from a carpet material, the backrest cover extending over the hard panel and having peripheral edges, wherein the backrest cover is provided with a decorative layer that lies atop a surface of the backrest cover; and
    a zip fastener that extends from the peripheral edges of the backrest cover at least partially around the panel.

2. A seat backrest according to claim 1, wherein the decorative layer includes customizable decors and motifs.

3. A seat backrest according to claim 1, wherein the hard panel comprises a thermoformed plastic material.

4. A seat backrest according to claim 1, wherein the zip fastener runs along two generally vertical edges and across a top horizontal edge of the seat backrest.

5. A seat backrest according to claim 1, wherein the seat is a bench seat.

6. A seat backrest according to claim 1, further including hooks that fasten the hard panel to the frame.

7. A seat backrest according to claim 1, further including clips that are molded into the hard panel.

8. A seat backrest according to claim 1, further including clips that are molded to a B surface of the hard panel.

9. A seat backrest according to claim 1, wherein the carpet material at least partially encapsulates the hard panel.

10. A seat backrest according to claim 9, wherein the zip fastener extends along at least one of the edges of the carpet material.

11. A seat backrest according to claim 1, further including a padding material that is inserted into a space between the backrest cover and the panel, thereby flattening crease lines in the backrest cover, the zip fastener serving to secure the padding material in the space.

12. A seat backrest according to claim 11 wherein the zip fastener holds the decorative layer in place on the backrest cover.

13. A seat having the backrest of claim 1.

14. The seat according to claim 13, wherein the seat is a back bench seat.

* * * * *